US012602176B2

(12) United States Patent
Lin

(10) Patent No.: US 12,602,176 B2
(45) Date of Patent: Apr. 14, 2026

(54) COMPUTING DEVICE AND METHOD THEREOF

(71) Applicant: PUFsecurity CORPORATION, Zhubei City (TW)

(72) Inventor: Wen-Ching Lin, Hsinchu County (TW)

(73) Assignee: PUFSECURITY CORPORATION, Hsinchu County (TW)

( * ) Notice: Subject to any disclaimer, the term of this patent is extended or adjusted under 35 U.S.C. 154(b) by 0 days.

(21) Appl. No.: 19/000,849

(22) Filed: Dec. 24, 2024

(65) Prior Publication Data

US 2025/0265001 A1    Aug. 21, 2025

Related U.S. Application Data

(60) Provisional application No. 63/554,140, filed on Feb. 15, 2024.

(51) Int. Cl.
*G06F 3/06* (2006.01)
*G06F 17/14* (2006.01)

(52) U.S. Cl.
CPC .......... *G06F 3/0625* (2013.01); *G06F 3/0656* (2013.01); *G06F 3/0659* (2013.01); *G06F 3/0673* (2013.01); *G06F 17/142* (2013.01)

(58) Field of Classification Search
CPC .... G06F 3/0625; G06F 3/0656; G06F 3/0659; G06F 3/0673; G06F 9/3001;
(Continued)

(56) References Cited

U.S. PATENT DOCUMENTS 8,738,680 B2     5/2014  Chaudhuri et al.
2008/0228845 A1*  9/2008  Chang ................... G06F 17/142
                                                        708/405
(Continued)

FOREIGN PATENT DOCUMENTS

JP          11-110370       4/1999
JP          2020-537756    12/2020
(Continued)

OTHER PUBLICATIONS

Bisheh-Niasar, M., Azarderakhsh, R., & Mozaffari-Kermani, M. (2021). Instruction-set accelerated implementation of crystals-kyber. IEEE Transactions on Circuits and Systems I: Regular Papers, 68(11), 4648-4659. https://doi.org/10.1109/tcsi.2021.3106639.
(Continued)

*Primary Examiner* — Gary W. Cygiel
(74) *Attorney, Agent, or Firm* — WPAT, P.C.; Anthony King

(57) ABSTRACT

The present application discloses a computing device. The computing device is able to perform a butterfly process upon a sequence of $2^N$ input data. The computing device includes a first buffer, a second buffer, a fetch unit, an arithmetic unit, and a control unit. The control unit is configured to have the fetch unit read $2^h$ input data from a memory as a first group of input data to the first buffer, have the arithmetic unit perform h stages of the butterfly process upon the first group of input data to generate a first group of updated data, have the fetch unit read another $2^h$ input data from the memory as a second group of input data to the second buffer when generating the first group of updated data, and have the fetch unit write the first group of updated data to the memory.

20 Claims, 7 Drawing Sheets

(58) Field of Classification Search
CPC .. G06F 9/30036; G06F 17/142; G06F 17/144;
G06F 2207/3884
USPC ........................................................ 708/404
See application file for complete search history.

(56) References Cited

U.S. PATENT DOCUMENTS

| | | |
|---|---|---|
| 2009/0313314 A1 | 12/2009 | Mundarath et al. |
| 2022/0237259 A1 | 7/2022 | Vitali |

FOREIGN PATENT DOCUMENTS

| | | |
|---|---|---|
| TW | 201003422 | 1/2010 |
| TW | I396096 | 5/2013 |
| WO | WO 2016027727 | 2/2016 |

OTHER PUBLICATIONS

Roy, S. S., Vercauteren, F., Mentens, N., Chen, D. D., & Verbauwhede, I. (2014). Compact Ring-Lwe cryptoprocessor. Lecture Notes in Computer Science, 371-391. https://doi.org/10.1007/978-3-662-44709-3_21.

Cohen, D. (1976). Simplified control of FFT hardware. IEEE Transactions on Acoustics, Speech, and Signal Processing, 24(6), 577-579. https://doi.org/10.1109/tassp.1976.1162854.

Ma, Y., & Wanhammar, L. (2000). A hardware efficient control of memory addressing for high-performance FFT processors. IEEE Transactions on Signal Processing, 48(3), 917-921. https://doi.org/10.1109/78.824693.

Search report of the EP counterpart application No. 25153342.8 issued by the EPO on Jul. 18, 2025.

Office Action of the EP counterpart application No. 25153342.8 issued by the EPO on Jul. 18, 2025.

Chen Xiangren et al: "CFNTT: Scalable 1-15 Radix-2/4 NTT Multiplication Architecture with an Efficient Conflict-free Memory Mapping Scheme", IACR Transactions on Cryptographic Hardware and Embedded Systems, Nov. 19, 2021 (Nov. 29, 2021), pp. 94-126.

Notice of Allowance and accompanying search report dated Feb. 10, 2026, for the Japanese (JP) family patent application.

Notice of Allowance and accompanying search report dated Jan. 29, 2026, for the Taiwanese (TW) family patent application.

U.S. Pat. No. 8738680B2 is the counterpart to TW201003422.

English abstract of JPH11110370A.

English abstract of JP 2020-537756.

* cited by examiner

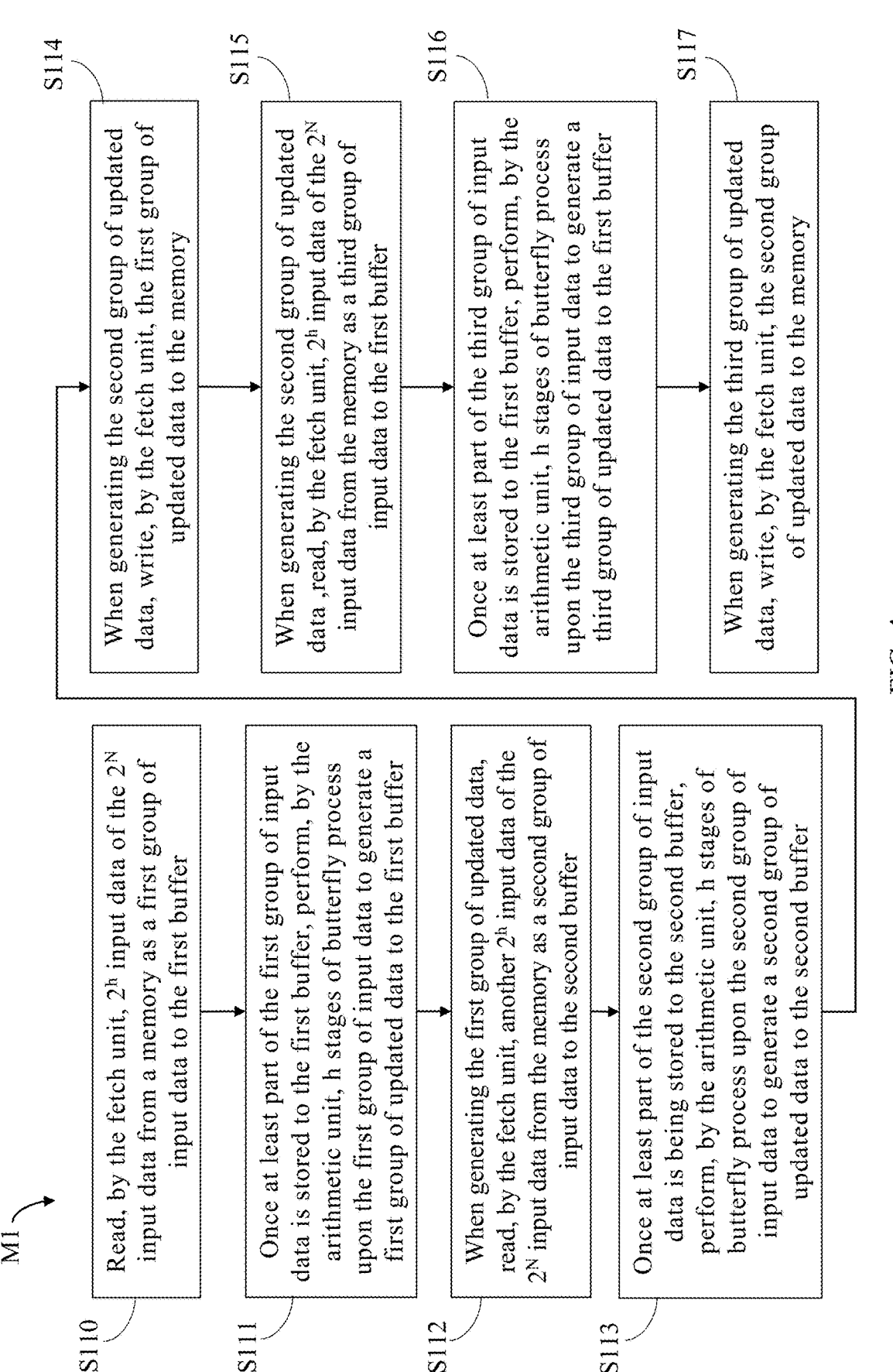

M1

S110 — Read, by the fetch unit, $2^h$ input data of the $2^N$ input data from a memory as a first group of input data to the first buffer S111 — Once at least part of the first group of input data is stored to the first buffer, perform, by the arithmetic unit, h stages of butterfly process upon the first group of input data to generate a first group of updated data to the first buffer S112 — When generating the first group of updated data, read, by the fetch unit, another $2^h$ input data of the $2^N$ input data from the memory as a second group of input data to the second buffer S113 — Once at least part of the second group of input data is being stored to the second buffer, perform, by the arithmetic unit, h stages of butterfly process upon the second group of input data to generate a second group of updated data to the second buffer S114 — When generating the second group of updated data, write, by the fetch unit, the first group of updated data to the memory S115 — When generating the second group of updated data ,read, by the fetch unit, $2^h$ input data of the $2^N$ input data from the memory as a third group of input data to the first buffer S116 — Once at least part of the third group of input data is stored to the first buffer, perform, by the arithmetic unit, h stages of butterfly process upon the third group of input data to generate a third group of updated data to the first buffer S117 — When generating the third group of updated data, write, by the fetch unit, the second group of updated data to the memory

FIG. 4

COMPUTING DEVICE AND METHOD THEREOF

CROSS REFERENCE

This application claims the benefit of prior-filed U.S. provisional application No. 63/554,140, filed on Feb. 15, 2024, which is incorporated by reference in its entirety.

TECHNICAL FIELD

The present disclosure relates to a computing device, and more particularly, to a computing device for performing number theoretic transform (NTT) or fast Fourier transform (FFT).

DISCUSSION OF THE BACKGROUND

Discrete Fourier transform (DFT) is widely used in signal processing and image processing, as it allows for the analysis of the frequency components of a signal. The fast Fourier transform (FFT) is a widely used algorithm for computing the DFT, and it is known for its efficiency and speed. It reduces the computational complexity of the DFT from $O(n^2)$ to $O(n \log n)$, where n is the number of input data points. This makes it particularly useful for real-time signal processing and other applications where speed is crucial.

On the other hand, the number-theoretic transform (NTT) is a variant of the FFT that is specifically designed for operations in finite fields. The NTT has been used in lattice-based cryptography, which is crucial for post-quantum cryptography and Homomorphic encryption scheme.

To facilitate the computation of FFT and NTT, the butterfly process scheme has been proposed. The butterfly process involves combining and reordering the input data in a specific way to efficiently compute the transform. However, since the butterfly process usually requires two input data and outputs two updated data in each calculation, making memory bandwidth a critical issue for hardware implementation. Therefore, how to design an appropriate computation scheme that performs the transformation more efficiently becomes an issue to be solved.

SUMMARY

One aspect of the present disclosure provides a computing device. The computing device is configured to perform a butterfly process upon a sequence of $2^N$ input data, wherein N is a positive integer. The computing device includes a first buffer, a second buffer, a fetch unit, arithmetic unit, and a control unit. The fetch unit is coupled to a memory, the first buffer and the second buffer. The arithmetic unit is coupled to the first buffer and the second buffer, and configured to perform arithmetic operations required by the butterfly process. The control unit is configured to have the fetch unit read $2^h$ input data of the $2^N$ input data from the memory in as a first group of input data, where the first group of input data is stored to the first buffer, and h is greater than or equal to 2 and is smaller than N. The control unit is further configured to have the arithmetic unit perform h stages of the butterfly process upon the first group of input data to generate a first group of updated data, where the first group of updated data is stored to the first buffer. The control unit is further configured to have the fetch unit read another $2^h$ input data of the $2^N$ input data from the memory as a second group of input data while generating the first group of updated data, where generating the first group of updated data, have the fetch unit read another $2^h$ input data of the $2^N$ input data from the memory as a second group of input data, wherein the second group of input data is stored to the second buffer. The control unit is further configured to have the fetch unit write the first group of updated data to the memory.

Another aspect of the present disclosure provides a method for operating a computing device to perform a butterfly process upon a sequence of $2^N$ input data, wherein N is a positive integer. The computing device comprises a first buffer, a second buffer, a fetch unit, and an arithmetic unit. The method comprises reading, by the fetch unit, $2^h$ input data of the $2^N$ input data from a memory as a first group of input data to the first buffer, where h is greater than or equal to 2 and is smaller than N, performing, by the arithmetic unit, h stages of the butterfly process upon the first group of input data to generate a first group of updated data to the first buffer, reading, by the fetch unit, another $2^h$ input data of the $2^N$ input data from the memory as a second group of input data to the second buffer while generating the first group of updated data, and writing, by the fetch unit, the first group of updated data to the memory.

BRIEF DESCRIPTION OF THE PLOTTINGS

A more complete understanding of the present disclosure may be derived by referring to the detailed description and claims when considered in connection with the Figures, where like reference numbers refer to similar elements throughout the Figures.

FIG. 4 shows a flow chart of a method for operating the computing device in FIG. 3 to perform the butterfly process according to one embodiment of the present disclosure.

DETAILED DESCRIPTION

To facilitate the computation of complicated Fourier transforms, Cooley and Tukey proposed a well-known algorithm that re-expresses the discrete Fourier transform (DFT) of a greater size into several DFTs of smaller sizes. For example, a DFT of a composite size N, can be re-expresses in terms of N1 DFTs of sizes N2 (where N, N1, and N2 are positive integers and N=N1·N2), and such re-expression can be performed recursively, thereby reducing the complexity of DFT.

Figure 1:
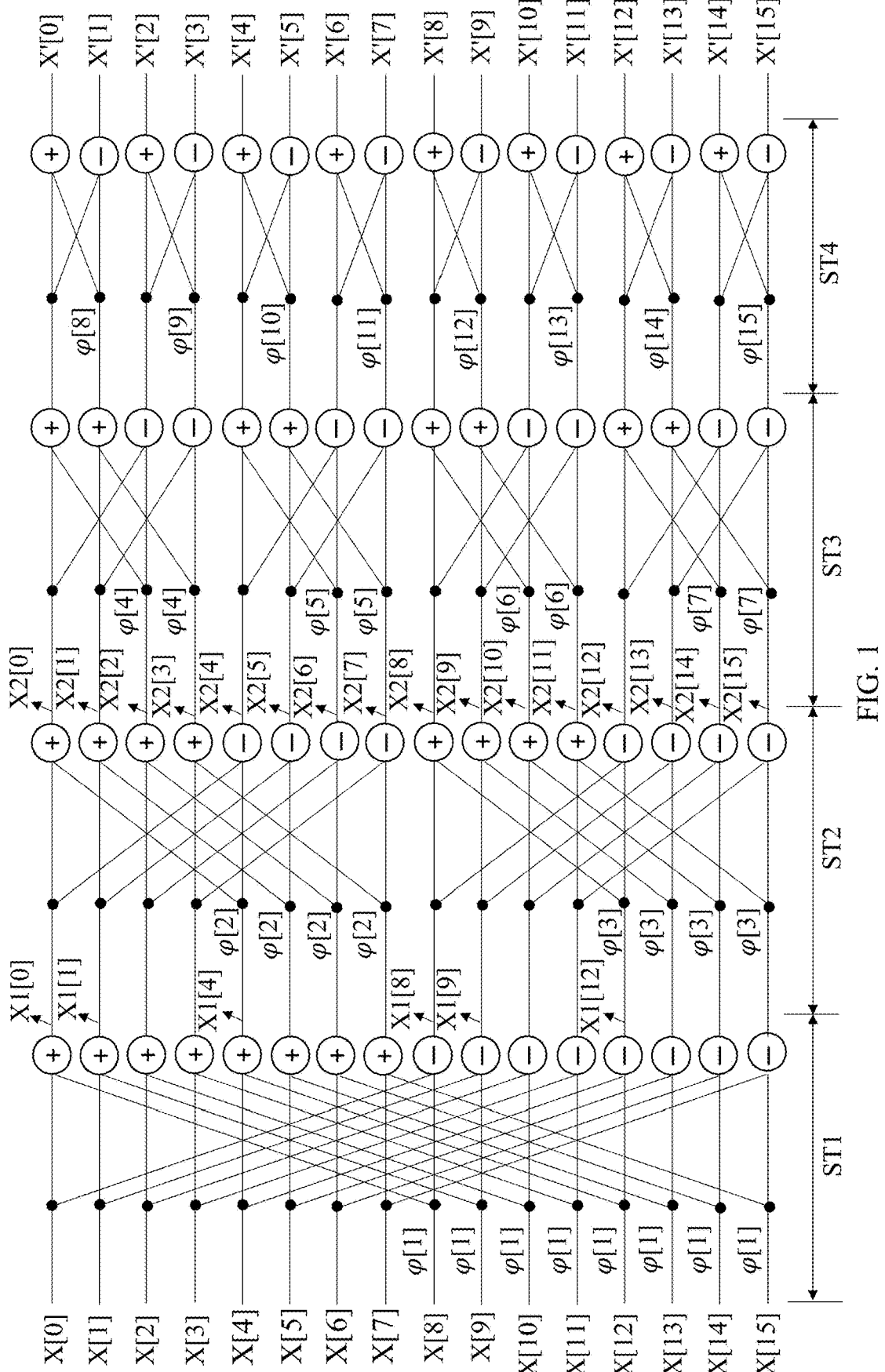
FIG. 1 shows a scheme of the butterfly process of NTT according to the Cooley-Tuckey algorithm.

Based on the Cooley-Tuckey algorithm, the butterfly process schemes have been developed to perform the fast Fourier transformation (FFT) or the number-theoretic transform (NTT) on hardware. FIG. 1 shows a scheme of the butterfly process of NTT according to the Cooley-Tuckey algorithm. In FIG. 1, the butterfly process is adopted to transform an input polynomial of $2^N-1$ degree (in the present embodiment, N equals to 4), and the 16 coefficients of the input polynomial would be the input data X[0] to X[15] of the butterfly process. In such case, the butterfly process shown in FIG. 1 can derive the transformed data X'[0] to X'[15] as the coefficients of the post-transformed polynomial according to the input data X[0] to X[15] and the predetermined twiddle factors $\varphi[1]$ to $\varphi[15]$.

The scheme of the butterfly process shown in FIG. 1 includes N stages (i.e., the four stages ST1, ST2, ST3, and ST4). In the first stage ST1, the input data X[0] and the input data X[8] can be retrieved, and a modular multiplication can be performed upon the input data X[8] and the predetermined twiddle factor Y[1] with the predetermined modulus q. In such case, the intermediate data X1[0] of the first stage ST1 can be derived by adding the input data X[0] and the result of the modular multiplication, and the intermediate data X1[8] of the first stage ST1 can be derived by subtracting the result of the modular multiplication from the input data X[0]. That is the intermediate data X1[0] and X1[8] can be represented as equations (1) and (2) shown below.

$$X1[0] = X[0] + X[8] \cdot \varphi[1] \bmod q. \tag{1}$$

$$X1[8] = X[0] - X[8] \cdot \varphi[1] \bmod q. \tag{2}$$

Similarly, the other intermediate data of the first stage ST1 can be derived by the same arithmetic operations. For example, a modular multiplication can be performed upon the input data X[9] and the twiddle factor $\varphi[1]$ with the predetermined modulus q, and the intermediate data X1[1] of the first stage ST1 can be derived by adding the input data X[1] and the result of the modular multiplication performed upon the input data X[9]. Also, the intermediate data X1[9] of the first stage ST1 can be derived by subtracting the result of the modular multiplication performed upon the input data X[9] from the input data X[1].

The arithmetic operations used for deriving the intermediate data of the first stage ST1 are further applied to the other stages so as to derive the intermediate data or the final transformed data. For example, in the second stage ST2, the intermediate data X1[0] and the intermediate data X1[4] can be retrieved, and a modular multiplication can be performed upon the intermediate data X1[4] and the twiddle factor q [2] with the predetermined modulus q. In such case, the intermediate data X2[0] of the second stage ST2 can be derived by adding the intermediate data X1[0] and the result of the modular multiplication performed upon the intermediate data X1[4], and the intermediate data X2[4] of the second stage ST2 can be derived by subtracting the result of the modular multiplication performed upon the intermediate data X1[4] from the intermediate data X1[0].

Figure 2:
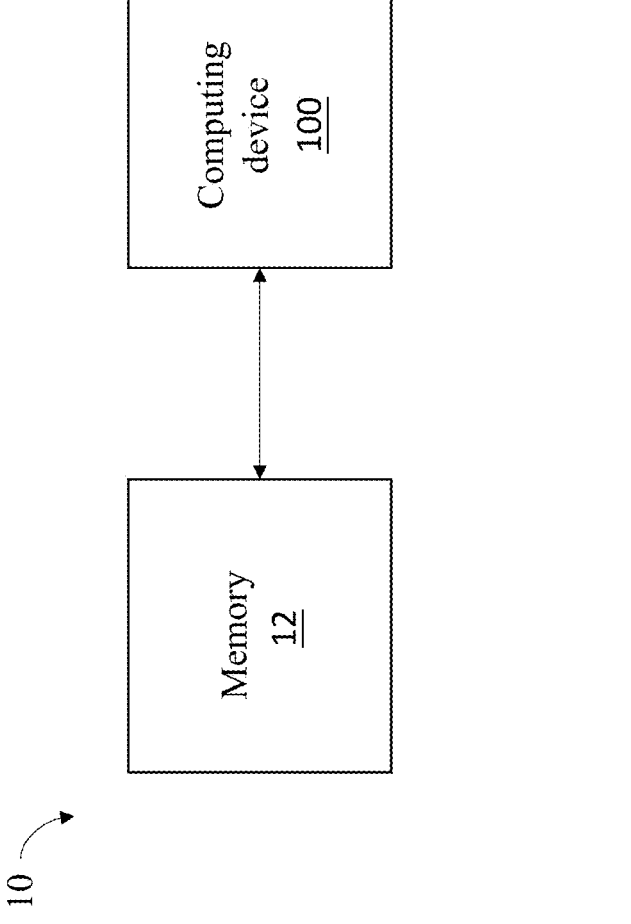
FIG. 2 shows a computing system according to one comparative embodiment of the present disclosure.

FIG. 2 shows a computing system 10 according to one comparative embodiment of the present disclosure. The computing system 10 can perform the butterfly process of FIG. 1. The computing system 10 includes a computing device 100 and a memory 12. In the present embodiment, the computing device 100 can complete the calculation of one stage for two input data per cycle. For example, the computing device 100 can derive the intermediate data X1[0] and X1[8] according to the input data X[0] and X[8] in one cycle, and can derive the intermediate data X1[1] and X1[9] according to the input data X[1] and X[9] in another cycle.

In such case, to maximize the utilization of the computing device 100, the computing device 100 would need to read two data from the memory 12 and write two data back to the memory 12 in each cycle, which means that the memory 12 will need to support two read operations and two write operations per cycle (assuming each word of the memory 12 only has the capacity to store one input data). However, most of the memories only support two accesses (e.g., two read operations, two write operations, or one read operation with one write operation) per cycle, and to have the memory support four accesses (e.g., a 4-port memory) per cycle will require extra design effort and circuit area. As a result, the adoption of the 4-port memory will significantly increase the cost, and the high-frequency access operations will cause considerable power consumption.

Figure 3:
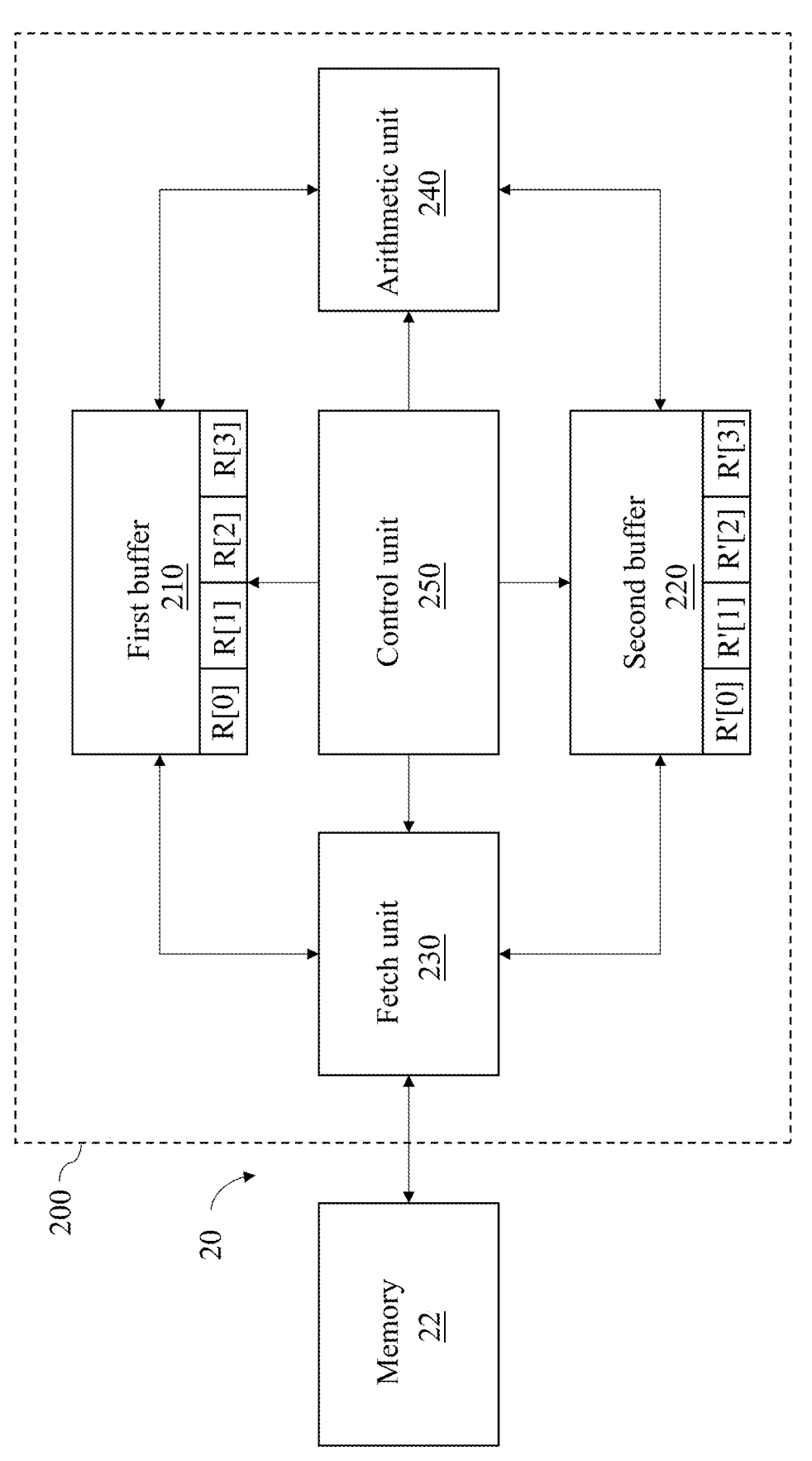
FIG. 3 shows a computing system according one embodiment of the present disclosure.

FIG. 3 shows a computing system 20 according one embodiment of the present disclosure. The computing system 20 includes a memory 22 and a computing device 200. Compared to the computing device 100, the computing device 200 is able to reduce the required memory bandwidth while maintaining the efficient utilization of the arithmetic unit in the computing device 200, thereby simplifying the hardware requirement and reducing the power consumption.

The computing device 200 includes a first buffer 210, a second buffer 220, a fetch unit 230, an arithmetic unit 240, and a control unit 250. The fetch unit 230 can be coupled to the memory 22, the first buffer 210 and the second buffer 220. The fetch unit 230 can read data from the memory 22 and write data to the memory 22. The first buffer 210 and the second buffer 220 can behave as a ping-pong buffer for receiving the data read from the memory 22 by the fetch unit 230 in turns and sending data to the fetch unit 230 for writing data to the memory 22 in turns. The arithmetic unit 240 is coupled to the first buffer 210 and the second buffer 220, and can perform arithmetic operations required by the butterfly process according to the data stored in the first buffer 210 and the second buffer 220, and the calculation results can be stored back to the first buffer 210 and the second buffer 220. The control unit 250 can control the data flow among the fetch unit 230, the first buffer 210, the second buffer 220, and the arithmetic unit 240 so as to perform the butterfly process. Each part of the computing device 200 can be realized in digital electronic circuitry, firmware, software, and/or combinations thereof. In addition, the memory 22 may be a static random-access memory (SRAM), but this disclosure is not limited thereto.

In the present embodiment, the computing device 200 is able to perform the butterfly process upon a sequence of $2^N$ input data for FFT or NTT, where N is a positive integer. In such case, each of the first buffer 210 and the second buffer 220 can have a capacity for storing $2^h$ input data of the $2^N$ input data, wherein h is greater than or equal to 2 and is smaller than N. Therefore, the computing device 200 can have the fetch unit 230 read $2^h$ input data from the memory 22 consecutively and store them to, for example, the first buffer 210. By reading corresponding input data according to the computing order determined by the butterfly process, the arithmetic unit 240 can then perform calculations of h stages of the butterfly process according to the $2^h$ input data stored in the first buffer 210.

Furthermore, the computing device 200 can have the fetch unit 230 read another $2^h$ input data from the memory 22 and store them to the second buffer 220 while the arithmetic unit 240 performs the calculations upon the input data stored in the first buffer 210. That is, by using the first buffer 210 and the second buffer 220 in an alternating manner to buffer input data for calculations of multiple stages of the butterfly process, it allows the computing device 200 to achieve a proper data scheduling that can maintain high hardware utilization of the arithmetic unit 240 while reducing the bandwidth required for the memory 22.

In some embodiments, the arithmetic unit 240 can complete the calculation of one stage of the butterfly process upon two input data in one cycle. Therefore, for the arithmetic unit 240 to perform h stages of the butterfly process for $2^h$ data, it will take $h \cdot 2^{h-1}$ cycles. In such case, the fetch unit 230 may need to read $2^h$ data and write $2^h$ data per $h \cdot 2^{h-1}$ cycles (i.e., $h \cdot 2^{h-2}$ cycles for reading following $h \cdot 2^{h-2}$ cycles for writing) so as to keep the arithmetic unit 240 busy. That is, the fetch unit 230 may read at least 4/h input data of the $2^N$ input data from the memory 22 in one cycle, or write at least 4/h updated data to the memory 22 in one cycle. Thus, when h has a higher value, the number of memory access per cycle required by the device system 20 will be less.

FIG. 4 shows a flow chart of a method M1 for operating the computing device 200 to perform the butterfly process according to one embodiment of the present disclosure. The method M1 includes steps S110 to S117.

In the present embodiment, the computing system 20 can perform the butterfly process shown in FIG. 1 with N equal to 4 and h equal to 2 according to the method M1. In such case, the first buffer 210 and the second buffer 220 may each have a capacity for storing $2^2$ (i.e., 4) input data, where the butterfly process is to be performed upon $2^4$ (i.e., 16) input data in total. For example, the first buffer 210 may include 4 registers R[0], R[1], R[2], and R[3] each for storing an input data as shown in FIG. 3. Similarly, the second buffer 220 may include 4 registers R'[0], R'[1], R'[2], and R'[3] each for storing an input data.

Table 1 shows a part of data scheduling of the computing device 200 for performing the butterfly process of NTT shown in FIG. 1.

TABLE 1

| Cycle | Fetch unit | Arithmetic unit | First buffer | Second buffer |
|---|---|---|---|---|
| #1 | Read X[0], X[8] | | | |
| #2 | Read X[4], X[12] | | Store X[0], X[8] to R[0], R[2] | |
| #3 | | Derive X1[0], X1[8] according to R[0], R[2] (stage ST1) | Store X[4], X[12] to R[1], R[3] Store X1[0], X1[8] to R[0], R[2] | |
| #4 | | Derive X1[4], X1[12] according to R[1], R[3] (stage ST1) | Store X1[4], X1[12] to R[1], R[3] | |
| #5 | Read X[1], X[9] | Derive X2[0], X2[4] according to R[0], R[1] (stage ST2) | Store X2[0], X2[4] to R[0], R[1] | |
| #6 | Read X[5], X[13] | Derive X2[8], X2[12] according to R[2], R[3] (stage ST2) | Store X2[8], X2[12] to R[2], R[3] | Store X[1], X[9] to R'[0], R'[2] |
| #7 | Write X2[0], X2[8] | Derive X1[1], X1[9] according to R'[0], R'[2] (stage ST1) | | Store X[5], X[13] to R'[1], R'[3] Store X1[1], X1[9] to R'[0], R'[2] |
| #8 | Write X2[4], X2[12] | Derive X1[5], X1[13] according to R'[1], R'[3] (stage ST1) | | Store X1[5], X1[13] to R'[1], R'[3] |
| #9 | Read X[2], X[10] | Derive X2[1], X2[5] according to R'[0], R'[1] (stage ST2) | | Store X2[1], X2[5] to R'[0], R'[1] |
| #10 | Read X[6], X[14] | Derive X2[9], X2[13] according to R'[2], R'[3] (stage ST2) | Store X[2], X[10] to R[0], R[2] | Store X2[9], X2[13] to R'[2], R'[3] |
| #11 | Write X2[1], X2[9] | Derive X1[2], X1[10] according to R[0], R[2] (stage ST1) | Store X[6], X[14] to R[1], R[3] Store X1[2], X1[10] to R[0], R[2] | |
| #12 | Write X2[5], X2[13] | Derive X1[6], X1[14] according to R[1], R[3] (stage ST1) | Store X1[6], X1[14] to R[1], R[3] | |

Referring to FIG. 1, FIG. 4, and Table 1, in step S110, the control unit 250 can have the fetch unit 230 read 4 input data from the memory in 2 (i.e., $h \cdot 2^{h-2}$) consecutive cycles as a first group of input data. The control unit 250 can have the first buffer 210 store the first group of input data. In the present embodiment with h equal to 2, the first group of input data may include a first input data of the $2^N$ input data, a $(2^{N-1}+1)^{th}$ input data of the $2^N$ input data, a $(2^{N-2}+1)^{th}$ input data of the $2^N$ input data, and a $(2^{N-1}+2^{N-2}+1)^{th}$ input data of the $2^N$ input data. For example, in Table 1, the fetch unit 230 can read the input data X[0] (i.e., the first input data of the 16 input data X[0] to X[15]) and X[8] (i.e., the $(2^{N-1}+1)^{th}$ input data of the 16 input data X[0] to X[15]) from the memory 22 in the first cycle #1, and can further read the input data X[4] (i.e., the $(2^{N-2}+1)^{th}$ input data of the 16 input data X[0] to X[15]) and X[12] (i.e., the $(2^{N-1}+2^{N-2}+1)^{th}$ input data of the 16 input data X[0] to X[15]) from the memory 22 in the second cycle #2. In the present embodiments, the memory 22 may deliver the read data in a next cycle after the read request is received in the first cycle #1, and thus, the fetch unit 230 can store the input data X[0] and X[8] to the registers R[0] and R[2] respectively in the second cycle #2, and can further store the input data X[4] and X[12] to the registers R[1] and R[3] respectively in the third cycle #3.

In step S111, once at least part of the first group of input data is stored to the first buffer 210, the control unit 250 can have the arithmetic unit 240 perform 2 stages (i.e., h stages) of the butterfly process upon the first group of input data stored in the first buffer 210 to generate a first group of updated data (i.e., the intermediate data X2[0], X2[8], X2[4], and X2[12]). The control unit 250 can have the first buffer 210 store the first group of updated data. In some embodiments, the arithmetic unit 240 can complete the calculations required for one stage of the butterfly process upon two input data in one cycle. For example, as shown in Table 1, the arithmetic unit 240 may derive the intermediate data X1[0] and X1[8] according to the input data X[0] and X[8] stored in the register R[0] and R[2] in the third cycle #3, and derive the intermediate data X1[4] and X1[12] according to the input data X[4] and X[12] stored in the register R[1] and R[3] in the $4^{th}$ cycle #4.

Correspondingly, the intermediate data X1[0], X1[8], X1[4], and X1[12] of the first stage ST1 of the butterfly process are stored to the first buffer 210 in an in-place manner. That is, the intermediate data X1[0] can be stored to the register R[0] which originally stores the corresponding input data X[0], the intermediate data X1[4] can be stored to the register R[1] which originally stores the corresponding input data X[4], and so on.

Subsequently, the arithmetic unit 240 may derive the intermediate data X2[0] and X2[4] according to the intermediate data X1[0] and X1[4] stored in the register R[0] and R[1] in the $5^{th}$ cycle #5,and derive the intermediate data X2[8] and X2[12] according to the intermediate data X1[8] and X1[12] stored in the register R[2] and R[3] in the $6^{th}$ cycle #6.Then, the control unit 250 can have the first buffer 210 store the first group of updated data (i.e., the intermediate data X2[0], X2[4], X2[8], and X2[12] of the second stage ST2 of the butterfly process). In the present embodiment, the intermediate data X2[0] and X2[4] are stored to the registers R[0] and R[1] of the first buffer 210 in the $5^{th}$ cycle #5,and the intermediate data X2[8] and X2[12] are stored to the registers R[2] and R[3] of the first buffer 210 in the $6^{th}$ cycle #6.

In step S112, when the arithmetic unit 240 generates the first group of updated data, the control unit 250 can have the fetch unit 230 read the input data X[1], X[9], X[5], X[13] as a second group of input data from the memory 22 in the $5^{th}$ cycle #5 and the $6^{th}$ cycle #6. In addition, the control unit 250 can have the second buffer 220 store the second group of input data. In the present embodiment, the input data X[1] and X[9] retrieved in the $5^{th}$ cycle #5 are stored to the registers R'[0] and R'[2] of the second buffer 220 respectively in the $6^{th}$ cycle #6, and the input data X[5] and X[13] retrieved in the $6^{th}$ cycle #6 are stored to the registers R'[1] and R'[3] of the second buffer 220 respectively in the $7^{th}$ cycle #7.

That is, when the arithmetic unit 240 performs the calculations for the second stage ST2 of the butterfly process upon the intermediate data X1[0], X1[4], X1[8], and X1[12], the fetch unit 230 can read the input data from the memory 22 for the subsequent calculations. Since the first buffer 210 will need to store the intermediate data X2[0], X2[4], X2[8], and X2[12] of the second stage ST2 of the butterfly process derived by the arithmetic unit 240 subsequently, the input data X[1], X[9], X[5], X[13] fetched by the fetch unit 230 are stored to the second buffer 220, thereby avoiding data conflict in the first buffer 210.

In step S113, once at least part of the second group of input data is stored to the second buffer 220, the control unit 250 can have the arithmetic unit 240 perform 2 stages of the butterfly process upon the second group of input data (i.e., the input data X[1], X[9], X[5], X[13]) to generate a second group of updated data. The control unit 250 can have the second buffer 220 store the second group of updated data. Specifically, as shown in Table 1, the arithmetic unit 240 may derive the intermediate data X1[1] and X1[9] of the first stage ST1 of the butterfly process according to the input data X[1] and X[9] stored in the registers R'[0] and R'[2] in the $7^{th}$ cycle #7, and derive the intermediate data X1[5] and X1[13] of the first stage ST1 of the butterfly process according to the input data X[5] and X[13] stored in the registers R'[1] and R'[3] in the $8^{th}$ cycle #8. In the present embodiment, intermediate data X1[1], X1[5], X1[9], and X1[13] are stored to the registers R'[0], R'[1], R'[2], R'[3] respectively in the in-place manner.

Subsequently, the arithmetic unit 240 may derive the intermediate data X2[1] and X2[5] of the second stage ST2 of the butterfly process according to the intermediate data X1[1] and X1[5] stored in the registers R'[0] and R'[1] in the $9^{th}$ cycle #9, and derive the intermediate data X2[9] and X2[13] of the second stage ST2 of the butterfly process according to the intermediate data X1[9] and X1[13] stored in the registers R'[2] and R'[3] in the $10^{th}$ cycle #10. Then, the control unit 250 can have the second buffer 220 store the second group of updated data (i.e., the intermediate data X2[1], X2[5], X2[9], and X2[13] of the second stage ST2 of the butterfly process). In the present embodiment, the intermediate data X2[1] and X2[5] are stored to the registers R'[0] and R'[1] of the second buffer 220 in the 9th cycle #9, and the intermediate data X2[9] and X2[13] are stored to the registers R'[2] and R'[3] of the second buffer 220 in the $10^{th}$ cycle #10.

In step S114, when step S113 is performed and the arithmetic unit 240 generates the second group of updated data (i.e., the intermediate data X2[1], X2[5], X2[9], and X2[13] of the second stage ST2 of the butterfly process), the control unit 250 can have the fetch unit 230 write the first group of updated data to the memory 22 in 2 (i.e., h·$2^{h-2}$) consecutive cycles. For example, the fetch unit 230 may write the intermediate data X2[0] and X2[8] to replace the input data X[0] and X[8] in the memory 22 in the $7^{th}$ cycle #7, and write the intermediate data X2[4] and X2[12] to replace the input data X[4] and X[12] in the memory 22 in the $8^{th}$ cycle #8.

Furthermore, in step S115, in the $9^{th}$ cycle #9 and the $10^{th}$ cycle #10 when step S113 is performed and the arithmetic unit 240 generates the second group of updated data (i.e., the intermediate data X2[1], X2[5], X2[9], and X2[13] of the second stage ST2 of the butterfly process), the control unit 250 can have the fetch unit 230 read the input data X[2], X[10], X[6], and X[14] from the memory 22 as a third group of input data. The control unit 250 can have the first buffer 210 store the third group of input data for the subsequent calculations.

In step S116, once at least part of the third group of input data is stored into the first buffer 210, the control unit 250 can have the arithmetic unit 240 perform 2 stages of the butterfly process upon the third group of input data (i.e., the input data X[2], X[10], X[6], X[14]) to generate a third group of updated data. Also, in step S117, when step S116 is performed and the arithmetic unit 240 generates the third group of updated data, the control unit 250 can have the fetch unit 230 write the second group of updated data to the memory 22 in 2 (i.e., h·$2^{h-2}$) consecutive cycles. For example, the fetch unit 230 may write the intermediate data X2[1] and X2[9] to replace the input data X[1] and X[9] in the memory 22 in the $11^{th}$ cycle #11, and write the intermediate data X2[5] and X2[13] to replace the input data X[5] and X[13] in the memory 22 in the $12^{th}$ cycle #12.

By repeating steps S110 to S117, the computing device 200 can update the input data X[0] to X[15] with the intermediate data X2[0] to X2[15] of the second stage ST2 of the butterfly process, and can further update the intermediate data X2[0] to X2[15] of the second stage ST2 of the butterfly process with the transformed data X' [0] to X' [15], thereby completing the butterfly process.

Since the computing system 20 and the method M1 adopt the first buffer 210 and the second buffer 220 to store multiple input data (e.g., 2h input data) in an alternating order, the data scheduling of the butterfly process can be optimized so that the fetch unit 230 and the arithmetic unit 240 can be pipelined properly, thereby reducing the memory bandwidth required for the memory 22 while maintaining the hardware utilization of the computing device 200.

Figure 5:
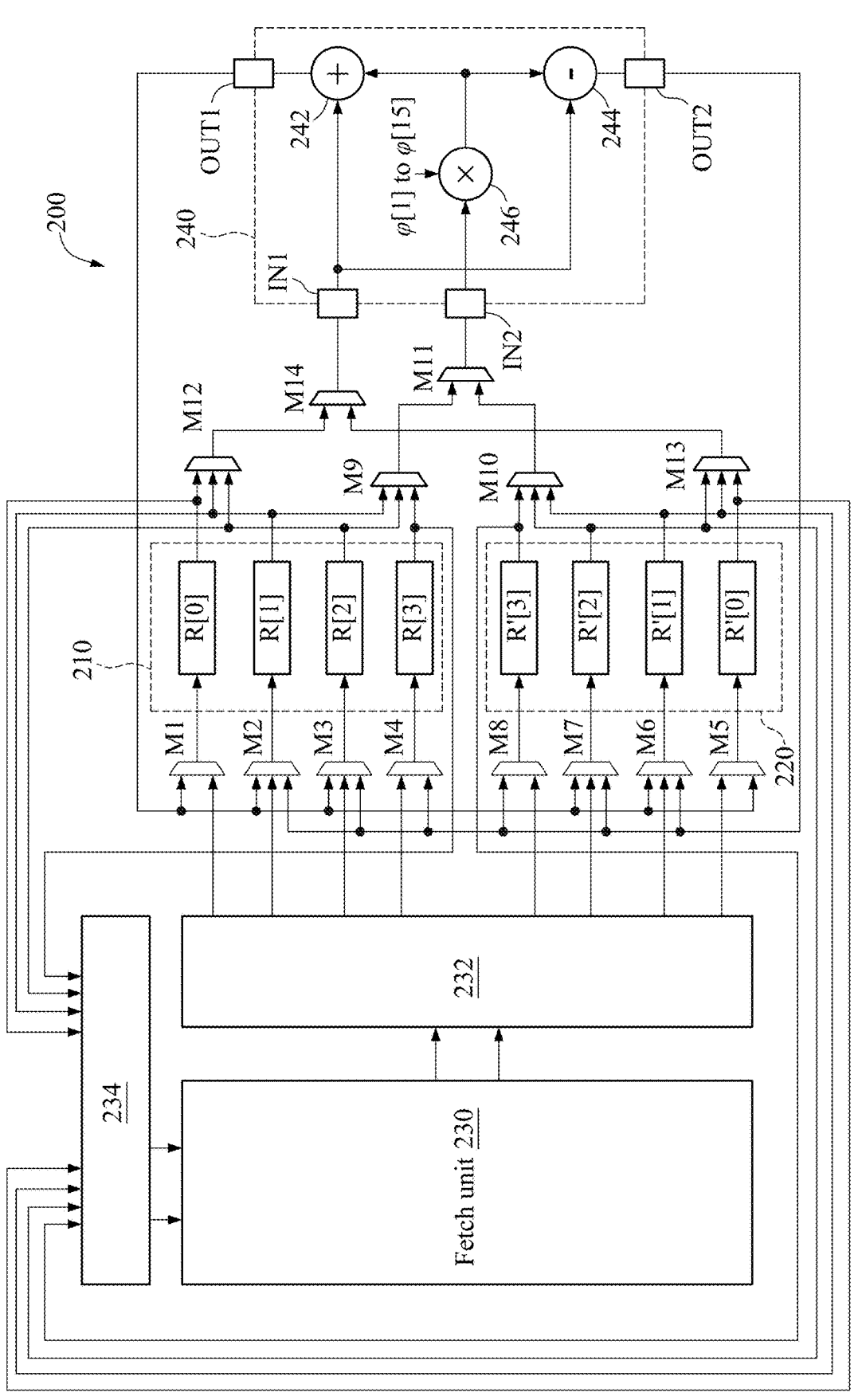
FIG. 5 shows a structure of data path control in the computing device in FIG. 3 for the butterfly process of NTT according to one embodiment of the present disclosure.

Furthermore, since the data flow of the butterfly process is predetermined and the arithmetic operations for all stages of the butterfly process are basically the same, a generalized data access scheme for the registers R[0] to R[3] of the first buffer 210 and the registers R'[0] to R'[3] of the second buffer 220 can be derived. FIG. 5 shows a structure of data path control in the computing device 200 for the butterfly process of NTT according to one embodiment of the present disclosure. That is the structure shown in FIG. 5 may be operated according to the method M1 of FIG. 4 to realize the scheme of the butterfly process of NTT shown in FIG. 1. As shown in FIG. 5, the computing device 200 further includes a plurality of multiplexer (MUX) M1 to M14. The MUX M1 to M14 can be controlled by the control unit 250 (the control unit 250 and the control lines coupled between the MUX M1 to M14 and the control unit 250 are not shown in FIG. 5 for brevity).

In the present embodiments, the arithmetic unit 240 includes an adder 242, a subtractor 244, and a modular multiplier 246. The adder 242 has a first input coupled to a first input terminal IN1 of the arithmetic unit 240, a second input terminal, and an output terminal coupled to a first output terminal OUT1 of the arithmetic unit 240. The subtractor 244 has a first input coupled to the first input terminal IN1 of the arithmetic unit 240, a second input terminal, and an output terminal coupled to a second output terminal OUT2 of the arithmetic unit 240. The modular multiplier 246 has a first input terminal coupled to a second input terminal IN2 of the arithmetic unit 240, a second input terminal configured to receive a corresponding twiddle factor (i.e., a corresponding one of the twiddle factors $\varphi[1]$ to $\varphi[15]$), and an output terminal coupled to the second input terminal of the adder 242 and the second input terminal of the subtractor 244. In some embodiment, the adder 242 and the subtractor 244 can each be implemented by an adder that supports signed addition, however, the present disclosure is not limited thereto.

The MUX M1 has a first input terminal coupled to the fetch unit 230, a second input terminal coupled to the first output terminal OUT1 of the arithmetic unit 240, and an output terminal coupled to the register R[0]. The MUX M2 has a first input terminal coupled to the fetch unit 230, a second input terminal coupled to the first output terminal OUT1 of the arithmetic unit 240, a third input terminal coupled to the second output terminal OUT2 of the arithmetic unit 240, and an output terminal coupled to the register R[1]. The MUX M3 has a first input terminal coupled to the fetch unit 230, a second input terminal coupled to the first output terminal OUT of the arithmetic unit 240, a third input terminal coupled to the second output terminal OUT2 of the arithmetic unit 240, and an output terminal coupled to the register R[2]. The MUX M4 has a first input terminal coupled to the fetch unit 230, a second input terminal coupled to the second output terminal OUT2 of the arithmetic unit 240, and an output terminal coupled to the register R[3].

The MUX M5 has a first input terminal coupled to the fetch unit 230, a second input terminal coupled to the first output terminal OUT1 of the arithmetic unit 240, and an output terminal coupled to the register R'[0]. The MUX M6 has a first input terminal coupled to the fetch unit 230, a second input terminal coupled to the first output terminal OUT1 of the arithmetic unit 240, a third input terminal coupled to the second output terminal OUT2 of the arithmetic unit 240, and an output terminal coupled to the register R'[1]. The MUX M7 has a first input terminal coupled to the fetch unit 230, a second input terminal coupled to the first output terminal OUT1 of the arithmetic unit 240, a third input terminal coupled to the second output terminal OUT2 of the arithmetic unit 240, and an output terminal coupled to the register R'[2]. The MUX M8 has a first input terminal coupled to the fetch unit 230, a second input terminal coupled to the second output terminal OUT2 of the arithmetic unit 240, and an output terminal coupled to the register R'[3].

The MUX M9 has a first input terminal coupled to the register R[1], a second input terminal coupled to the register R[2], a third input terminal coupled to the register R[3], and an output terminal. The MUX M10 has a first input terminal coupled to the register R'[1], a second input terminal coupled to the register R'[2], a third input terminal coupled to the register R'[3], and an output terminal. The MUX M11 has a first input terminal coupled to the output terminal of the MUX M9, a second input terminal coupled to the output terminal of the MUX M10, and an output terminal coupled to the second input terminal IN2 of the arithmetic unit 240.

The MUX M12 has a first input terminal coupled to the register R[0], a second input terminal coupled to the register R[1], a third input terminal coupled to the register R[2], and an output terminal. The MUX M13 has a first input terminal coupled to the register R'[0], a second input terminal coupled to the register R'[1], a third input terminal coupled to the register R'[2], and an output terminal. The MUX M14 has a first input terminal coupled to the output terminal of the MUX M12, a second input terminal coupled to the output terminal of the MUX M13, and an output terminal coupled to the first input terminal IN1 of the arithmetic unit 240.

As a result, by controlling the multiplexers M1 to M14, the control unit 250 can control the data flow of the computing device 200 so that the arithmetic unit 240 can receive the corresponding data for calculation and can store the calculation result to the corresponding registers accordingly, thereby completing the calculations for each stage of the butterfly process.

In some embodiments, the computing device 200 may further include data path control units 232 and 234 for controlling the data flow between the fetch unit 230 and the registers R[0] to R[3] and between the fetch unit 230 and the registers R'[0] to R'[3]. In some embodiments, each of the data path control units 232 and 234 may include multiplexers, de-multiplexers or a combination thereof, that is, the data path control units 232 and 234 can be realized in digital electronic circuitry.

In the present embodiment, the computing system 20 is adopted to perform the NTT, however, the present disclosure is not limited thereto. In some embodiments, the computing system 20 can also be adopted to perform the FFT by simply changing the input data and the twiddle factors.

Figure 6:
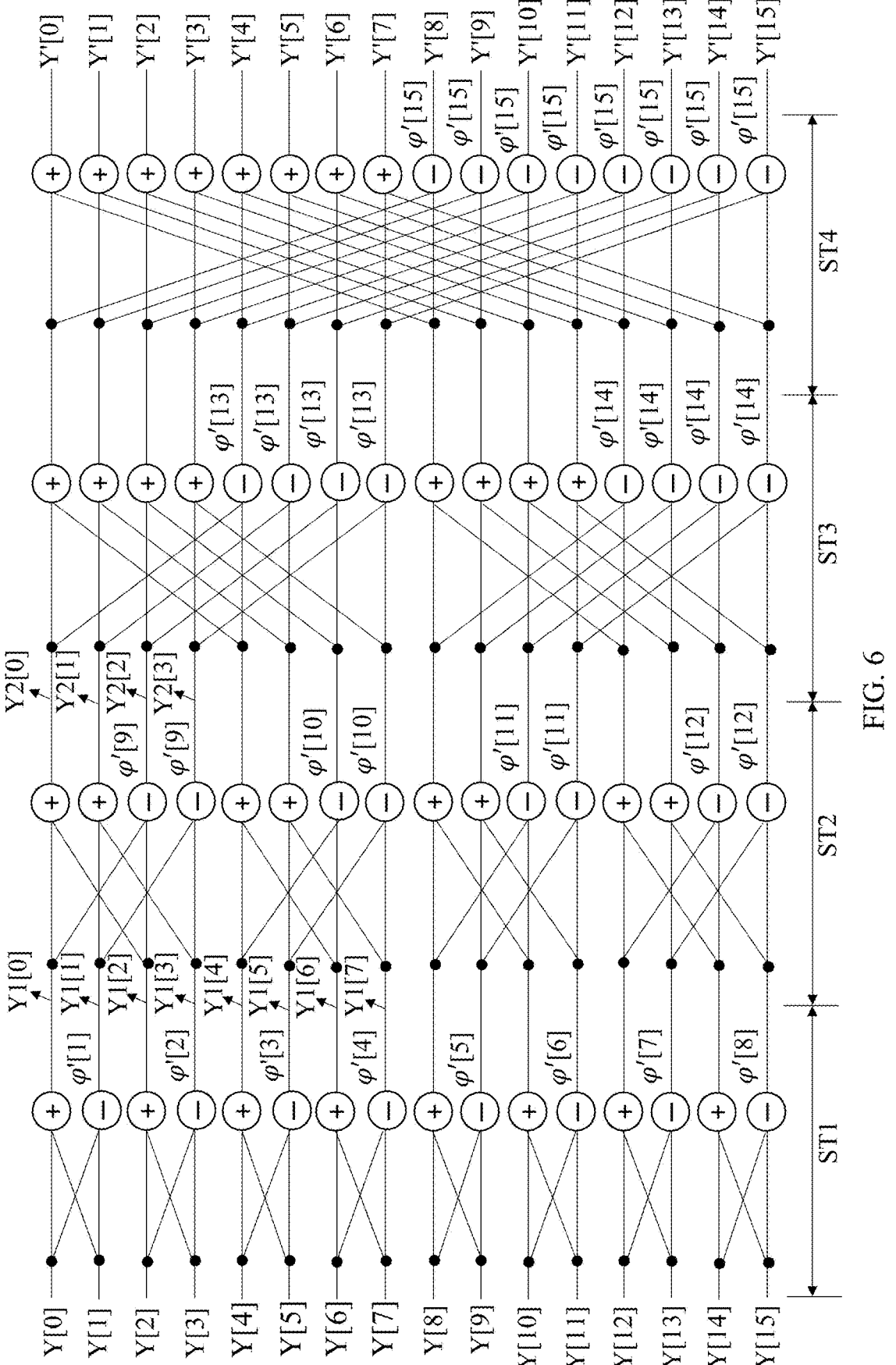
FIG. 6 shows a scheme of the butterfly process of INTT according to the Gentleman-Sande algorithm.

Furthermore, in some embodiments, the computing system 20 can further be used to perform the inverse NTT (INTT) and the inverse FFT (IFFT). FIG. 6 shows a scheme of the butterfly process of INTT according to the Gentleman-Sande algorithm. In FIG. 6, the butterfly process of INTT transforms the $2^N$ (in the present embodiment, N equals to 4) input data Y[0] to Y[15] into $2^N$ transformed data Y'[0] to Y'[15]. The butterfly process of INTT shown in FIG. 6 is as an inversed version of the butterfly process of NTT shown in FIG. 1 with the inversed twiddle factors $\varphi'[1]$ to $\varphi'[15]$.

For example, the intermediate data Y1[0] of the first stage ST1 of the butterfly process in FIG. 6 can be derived by adding the input data Y[0] and the input data Y[1], and the intermediate data Y1[1] of the first stage ST1 of the butterfly process in FIG. 6 can be derived by subtracting the input data Y[1] from the input data Y[0], and performing a modular multiplication upon the result of the subtraction and the corresponding twiddle factor Y'[1] with the predetermined modulus q. That is the intermediate data Y1[0] and Y1[1] can be represented as equations (3) and (4) shown below.

$$Y1[0] = Y[0] + Y[1]. \tag{3}$$

$$Y1[1] = (Y[0] - Y[1]) \cdot \varphi'[1] \bmod q. \tag{4}$$

Figure 7:
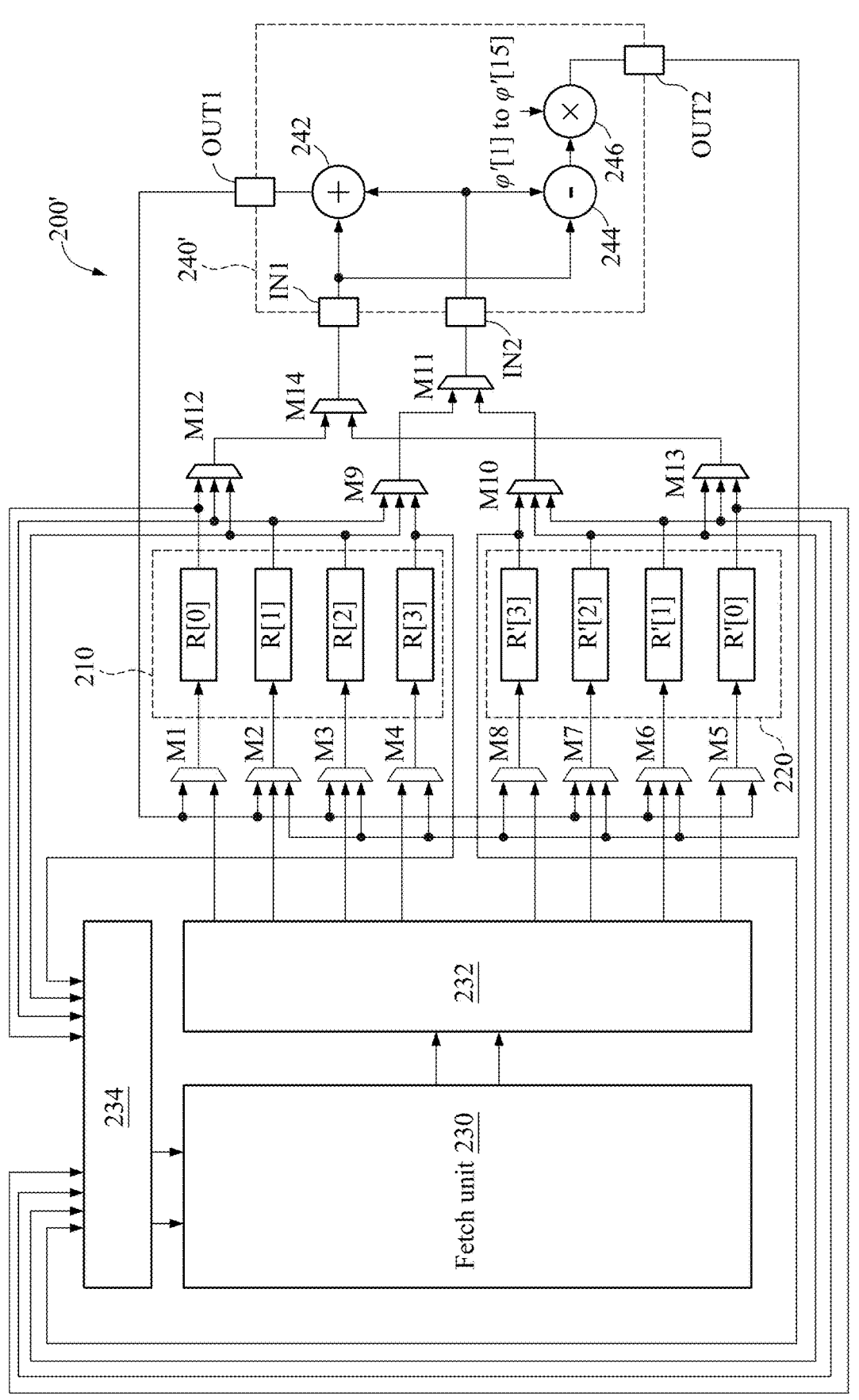
FIG. 7 shows a structure of data path control in the computing device in FIG. 3 for the butterfly process of INTT according to one embodiment of the present disclosure.

In the present embodiment, a computing device 200' as shown in FIG. 7, which is different from the computing device 200 by replacing the arithmetic unit 240 with the arithmetic unit 240' for calculating equations (3) and (4), can be adopted to perform the butterfly process of INTT as shown in FIG. 6. For example, the computing device 200' can have the fetch unit 230 read $2^h$ input data from the memory 22 consecutively and store them to, for example, the first buffer 210. By reading corresponding input data according to the computing order determined by the butterfly process of INTT, the arithmetic unit 240' can then perform calculations of h stages of the butterfly process of INTT according to the $2^h$ input data stored in the first buffer 210.

Furthermore, the computing device 200' can have the fetch unit 230 read another $2^h$ input data from the memory 22 and store them to the second buffer 220 while the arithmetic unit 240' performs the calculations upon the input data stored in the first buffer 210. That is, when performing the butterfly process of INTT, the computing device 200' can still take the advantage of the first buffer 210 and the second buffer 220 to buffer the input data in an alternating manner so that the fetch unit 230 and the arithmetic unit 240' can be pipelined properly, thereby maintaining the high hardware utilization of the arithmetic unit 240' while reducing the memory bandwidth required for the memory 22. In the present embodiment, the computing system 20 can be adopted to perform the INTT, however, the present disclosure is not limited thereto. In some embodiments, the computing system 20 can also be adopted to perform the IFFT by simply changing the input data and the twiddle factors.

Table 2 shows a part of data scheduling of the computing device 200' for performing the butterfly process of INTT shown in FIG. 6.

TABLE 2

| Cycle | Fetch unit | Arithmetic unit | First buffer | Second buffer |
|---|---|---|---|---|
| #1 | Read Y[0], Y[1] | | | |
| #2 | Read Y[2], Y[3] | | | Store Y[0], Y[1] to R[0], R[1] |
| #3 | | Derive Y1[0], Y1[1] according to R[0], R[1] (stage ST1) | Store Y[2], X[3] to R[2], R[3] Store Y1[0], Y1[1] to R[0], R[1] | |
| #4 | | Derive Y1[2], Y1[3] according to R[2], R[3] (stage ST1) | Store Y1[2], Y1[3] to R[2], R[3] | |
| #5 | Read Y[4], Y[5] | Derive Y2[0], Y2[2] according to R[0], R[2] (stage ST2) | Store Y2[0], Y2[2] to R[0], R[2] | |

TABLE 2-continued

| Cycle | Fetch unit | Arithmetic unit | First buffer | Second buffer |
|---|---|---|---|---|
| #6 | Read Y[6], Y[7] | Derive Y2[1], Y2[3] according to R[1], R[3] (stage ST2) | Store Y2[1], Y2[3] to R[1], R[3] | Store Y[4], Y[5] to R'[0], R'[1] |
| #7 | Write Y2[0], Y2[2] | Derive Y1[4], Y1[5] according to R'[0], R'[1] (stage ST1) | | Store Y[6], Y[7] to R'[2], R'[3] Store Y1[4], Y1[5] to R'[0], R'[1] |
| #8 | Write Y2[1], Y2[3] | Derive Y1[6], Y1[7] according to R'[2], R'[3] (stage ST1) | | Store Y1[6], Y1[7] to R'[2], R'[3] |
| #9 | Read Y[8], Y[9] | Derive Y2[4], Y2[6] according to R'[0], R'[2] (stage ST2) | | Store Y2[4], Y2[6] to R'[0], R'[2] |
| #10 | Read Y[10], Y[11] | Derive Y2[5], Y2[7] according to R'[1], R'[3] (stage ST2) | Store Y[8], Y[9] to R[0], R[1] | Store Y2[5], Y2[7] to R'[1], R'[3] |
| #11 | Write Y2[4], Y2[6] | Derive Y1[8], Y1[9] according to R[0], R[1] (stage ST1) | Store Y[10], Y[11] to R[2], R[3] Store Y1[8], Y1[9] to R[0], R[1] | |
| #12 | Write Y2[5], Y2[7] | Derive Y1[10], Y1[11] according to R[2], R[3] (stage ST1) | Store Y1[10], Y1[11] to R[2], R[3] | |

Referring to FIG. 6 and Table 2, the control unit 250 can have the fetch unit 230 read 4 input data from the memory 22 in 2 (i.e., $h \cdot 2^{h-2}$) consecutive cycles. In the present embodiment with h equal to 2, for example, the input data read in the first cycle #1 and the second cycle #2 may include a first input data (e.g., data Y[0]) of the $2^N$ input data, a second input data (e.g., data Y[1]) of the $2^N$ input data, a third input data (e.g., data Y[2]) of the $2^N$ input data, and a fourth input data (e.g., data Y[3]) of the $2^N$ input data.

Since the data flow of the butterfly process of INTT is predetermined and the arithmetic operations for all stages of the butterfly process are basically the same, a generalized data access scheme for the registers R[0] to R[3] of the first buffer 210 and the registers R'[0] to R'[3] of the second buffer 220 can be derived. FIG. 7 shows a structure of data path control in the computing device 200' for the butterfly process of INTT according to one embodiment of the present disclosure. That is, the structure shown in FIG. 7 may be operated according to the method M1 of FIG. 4 to realize the scheme of the butterfly process of INTT shown in FIG. 6.

As shown in FIG. 7, the mux M1 to M14 adopted in the structure of data path control for the butterfly process of NTT in FIG. 5 can also be adopted for the butterfly process of INTT in FIG. 7. The difference between the structures shown in FIG. 5 and FIG. 7 is in that the arithmetic unit 240' is reconfigured according to the arithmetic operations required by the butterfly process of INTT. Specifically, the first input terminal IN1 of the arithmetic unit 240' is coupled to the first input terminal of the adder 242 and the first input terminal of the subtractor 244, and the first input terminal IN2 of the arithmetic unit 240' is coupled to the second input terminal of the adder 242 and the second input terminal of the subtractor 244, the first output terminal OUT1 of the arithmetic unit 240' is coupled to the output terminal of the adder 242, and the second output terminal OUT2 of the arithmetic unit 240' is coupled to the output terminal of the modular multiplier 246. In addition, the output terminal of the subtractor 244 is coupled to the first input terminal of the modular multiplier 246. The second input terminal of the modular multiplier 246 is configured to receive a corresponding twiddle factor (i.e., a corresponding one of the twiddle factors Φ'[1] to Φ'[15]). In some embodiments, the arithmetic unit 240' may include multiplexers (not shown in FIG. 5 and FIG. 7) for reconfiguring the data flow thereof so that the arithmetic unit 240' can have the configuration as shown in FIG. 5 when performing NTT or FFT, and can be changed to have the configuration shown in FIG. 7 for performing INTT or IFFT.

By controlling the multiplexers M1 to M14 with the control unit 250 properly, the computing device 200' is able to perform the butterfly process of INTT and take the advantage of the first buffer 210 and the second buffer 220 to store multiple input data in an alternating order, thereby optimizing the data scheduling of the butterfly process and allowing the fetch unit 230 and the arithmetic unit 240' to be pipelined properly. As a result, the memory bandwidth required for the memory 22 can be reduced, and the hardware utilization of the computing device 200' can be maintained.

In summary, the computing devices, the computing systems and the methods for operating the computing devices provided by the embodiments of the present disclosure adopt two buffers to store multiple input data (e.g., $2^h$ input data) in an alternating order, so the data scheduling of the butterfly process can be optimized, allowing the operations of the fetch unit and the arithmetic unit to be pipelined properly. As a result, the memory bandwidth required by the memory can be reduced and the hardware utilization of the computing device can be maintained.

What is claimed is:

1. A computing device configured to perform a butterfly process upon a sequence of $2^N$ input data, wherein N is a positive integer and the computing device comprises:
   a first buffer;
   a second buffer;
   a fetch unit coupled to a memory, the first buffer and the second buffer;
   an arithmetic unit coupled to the first buffer and the second buffer, and configured to perform arithmetic operations required by the butterfly process; and
   a control unit configured to:
      have the fetch unit read $2^h$ input data of the $2^N$ input data from the memory as a first group of input data, wherein the first group of input data is stored to the first buffer, and h is greater than or equal to 2 and is smaller than N;
      have the arithmetic unit perform h stages of the butterfly process upon the first group of input data to generate a first group of updated data, wherein the first group of updated data is stored to the first buffer;
      when generating the first group of updated data, have the fetch unit read another $2^h$ input data of the $2^N$ input data from the memory as a second group of input data, wherein the second group of input data is stored to the second buffer; and
      have the fetch unit write the first group of updated data to the memory.

2. The computing device of claim 1, wherein the control unit is further configured to:
   once at least part of the second group of input data is stored to the second buffer, have the arithmetic unit perform h stages of the butterfly process upon the second group of input data to generate a second group of updated data, wherein the second group of updated data is stored to the second buffer.

3. The computing device of claim 2, wherein when generating the second group of updated data, the control unit has the fetch unit write the first group of updated data to the memory.

4. The computing device of claim 2, wherein the control unit is further configured to:
   when generating the second group of updated data, have the fetch unit read yet another $2^h$ input data of the $2^N$ input data from the memory as a third group of input data, wherein the third group of input data is stored to the first buffer.

5. The computing device of claim 1, wherein once at least part of the first group of input data is stored to the first buffer, the control unit has the arithmetic unit perform the h stages of the butterfly process upon the first group of input data.

6. The computing device of claim 1, wherein intermediate data produced during a first stage of the h stages of the butterfly process upon the first group of input data are stored to the first buffer in an in-place manner.

7. The computing device of claim 1, wherein within one cycle, the arithmetic unit is configured to complete calculations required for one stage of the butterfly process upon two input data.

8. The computing device of claim 7, further comprising:
   a first multiplexer (MUX) having a first input terminal coupled to the fetch unit, a second input terminal coupled to the first output terminal of the arithmetic unit, and an output terminal coupled to a first register of the first buffer;
   a second MUX having a first input terminal coupled to the fetch unit, a second input terminal coupled to the first output terminal of the arithmetic unit, a third input terminal coupled to the second output terminal of the arithmetic unit, and an output terminal coupled to a second register of the first buffer;
   a third MUX having a first input terminal coupled to the fetch unit, a second input terminal coupled to the first output terminal of the arithmetic unit, a third input terminal coupled to the second output terminal of the arithmetic unit, and an output terminal coupled to a third register of the first buffer;
   a fourth MUX having a first input terminal coupled to the fetch unit, a second input terminal coupled to the second output terminal of the arithmetic unit, and an output terminal coupled to a fourth register of the first buffer;
   a fifth MUX having a first input terminal coupled to the fetch unit, a second input terminal coupled to the first output terminal of the arithmetic unit, and an output terminal coupled to a first register of the second buffer;
   a sixth MUX having a first input terminal coupled to the fetch unit, a second input terminal coupled to the first output terminal of the arithmetic unit, a third input terminal coupled to the second output terminal of the arithmetic unit, and an output terminal coupled to a second register of the second buffer;
   a seventh MUX having a first input terminal coupled to the fetch unit, a second input terminal coupled to the first output terminal of the arithmetic unit, a third input terminal coupled to the second output terminal of the arithmetic unit, and an output terminal coupled to a third register of the second buffer; and an eighth MUX having a first input terminal coupled to the fetch unit, a second input terminal coupled to the second output terminal of the arithmetic unit, and an output terminal coupled to a fourth register of the second buffer.

9. The computing device of claim 1, wherein the butterfly process is for fast Fourier transformation (FFT) or number-theoretic transform (NTT), and the arithmetic unit comprises:

an adder having a first input coupled to a first input terminal of the arithmetic unit, a second input terminal, and an output terminal coupled to a first output terminal of the arithmetic unit;

a subtractor having a first input coupled to the first input terminal of the arithmetic unit, a second input terminal, and an output terminal coupled to a second output terminal of the arithmetic unit; and a modular multiplier having a first input terminal coupled to a second input terminal of the arithmetic unit, a second input terminal configured to receive a corresponding twiddle factor, and an output terminal coupled to the second input terminal of the adder and the second input terminal of the subtractor.

10. The computing device of claim 8, further comprising:

a ninth MUX having a first input terminal coupled to the second register of the first buffer, a second input terminal coupled to the third register of the first buffer, a third input terminal coupled to the fourth register of the first buffer, and an output terminal;

a tenth MUX having a first input terminal coupled to the second register of the second register, a second input terminal coupled to the third register of the second buffer, a third input terminal coupled to the fourth register of the second buffer, and an output terminal; and an eleventh MUX having a first input terminal coupled to the output terminal of the ninth MUX, a second input terminal coupled to the output terminal of the tenth MUX, and an output terminal coupled to the second input terminal of the arithmetic unit.

11. The computing device of claim 8, further comprising:

a twelfth MUX having a first input terminal coupled to the first register of the first buffer, a second input terminal coupled to the second register of the first buffer, a third input terminal coupled to the third register of the first buffer, and an output terminal;

a thirteenth MUX having a first input terminal coupled to the first register of the second buffer, a second input terminal coupled to the second register of the second buffer, a third input terminal coupled to the third register of the second buffer, and an output terminal; and a fourteenth MUX having a first input terminal coupled to the output terminal of the twelfth MUX, a second input terminal coupled to the output terminal of the thirteenth MUX, and an output terminal coupled to the first input terminal of the arithmetic unit.

12. A method for operating a computing device to perform a butterfly process upon a sequence of $2^N$ input data, wherein N is a positive integer and the computing device comprises a first buffer, a second buffer, a fetch unit, and an arithmetic unit, and the method comprises:

reading, by the fetch unit, $2^h$ input data of the $2^N$ input data from a memory as a first group of input data to the first buffer, wherein h is greater than or equal to 2 and is smaller than N;

performing, by the arithmetic unit, h stages of the butterfly process upon the first group of input data to generate a first group of updated data to the first buffer;

when generating the first group of updated data, reading, by the fetch unit, another $2^h$ input data of the $2^N$ input data from the memory as a second group of input data to the second buffer; and writing, by the fetch unit, the first group of updated data to the memory.

13. The method of claim 12, further comprising:

once at least part of the second group of input data is stored to the second buffer, performing, by the arithmetic unit, h stages of the butterfly process upon the second group of input data to generate a second group of updated data to the second buffer.

14. The method of claim 13, wherein the step of writing, by the fetch unit, the first group of updated data to the memory is performed when generating the second group of updated data.

15. The method of claim 13, further comprising:

when generating the second group of updated data, reading, by the fetch unit, yet another $2^h$ input data of the $2^N$ input data from the memory as a third group of input data to the first buffer.

16. The method of claim 12, wherein the step of performing, by the arithmetic unit, the h stages of the butterfly process upon the first group of input data to generate the first group of updated data to the first buffer is performed once at least part of the first group of input data is stored to the first buffer.

17. The method of claim 12, further comprising storing, by the first buffer, intermediate data produced during a first stage of the h stages of the butterfly process upon the first group of input data in an in-place manner.

18. The method of claim 12, wherein h is equal to 2, the butterfly process is for NTT or FFT, and first group of input data comprises a first input data of the $2^N$ input data, a $(2^{N-2}+1)^{th}$ input data of the $2^N$ input data, a $(2^{N-1}+1)^{th}$ input data of the $2^N$ input data, and a $(2^{N-1}+2^{N-2}+1)^{th}$ input data of the $2^N$ input data.

19. The method of claim 12, wherein h is equal to 2, the butterfly process is for INTT or IFFT, and first group of input data comprises a first input data of the $2^N$ input data, a second input data of the $2^N$ input data, a third input data of the $2^N$ input data, and a fourth input data of the $2^N$ input data.

20. The method of claim 12, wherein the step of performing, by the arithmetic unit, the h stages of the butterfly process upon the first group of input data to generate the first group of updated data to the first buffer comprises:

completing, by the arithmetic unit, calculations required for one stage of the butterfly process upon two input data within one cycle.

* * * * *